(12) United States Patent
Ohta et al.

(10) Patent No.: US 11,832,194 B2
(45) Date of Patent: Nov. 28, 2023

(54) BASE STATION DEVICE, TERMINAL DEVICE, WIRELESS COMMUNICATION SYSTEM, AND COMMUNICATION METHOD

(71) Applicant: FUJITSU LIMITED, Kawasaki (JP)

(72) Inventors: Yoshiaki Ohta, Yokohama (JP); Yoshihiro Kawasaki, Kawasaki (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/704,459

(22) Filed: Dec. 5, 2019

(65) Prior Publication Data
US 2020/0112963 A1  Apr. 9, 2020

Related U.S. Application Data (63) Continuation of application No. PCT/JP2017/022208, filed on Jun. 15, 2017.

(51) Int. Cl.
*H04W 28/02* (2009.01)
*H04W 52/14* (2009.01)
(Continued)

(52) U.S. Cl.
CPC ..... *H04W 52/281* (2013.01); *H04W 28/0215* (2013.01); *H04W 52/146* (2013.01);
(Continued)

(58) Field of Classification Search
CPC ......... H04W 28/0215–0221; H04W 52/02–60; H04W 68/005; H04W 72/0473;
(Continued)

(56) References Cited

U.S. PATENT DOCUMENTS

2010/0304753 A1   12/2010  Furuya
2011/0267994 A1   11/2011  Pan et al.
(Continued)

FOREIGN PATENT DOCUMENTS

CN   102640546 A   8/2012
JP   2011-520335 A   7/2011
(Continued)

OTHER PUBLICATIONS

Extended European search report with supplementary European search report and the European search opinion issued by the European Patent Office for corresponding European Patent Application No. 17913811.0-1205, dated May 19, 2020.
(Continued)

*Primary Examiner* — Timothy J Weidner
(74) *Attorney, Agent, or Firm* — Myers Wolin, LLC (57) ABSTRACT

A base station device includes: a controller configured to determine whether a calculation method for a single term among a plurality of terms included in an equation for determining a transmission power is either a first method or a second method; and a transmitter configured to transmit notification information for notifying the calculation method determined by the controller. The controller determines either the first method or the second method for first data, and determines either the first method or the second method for second data different from the first data.

8 Claims, 8 Drawing Sheets

(51) Int. Cl.

| | | |
|---|---|---|
| *H04W 52/22* | (2009.01) | |
| *H04W 52/24* | (2009.01) | |
| *H04W 52/28* | (2009.01) | |
| *H04W 52/36* | (2009.01) | |
| *H04W 52/58* | (2009.01) | |
| *H04W 68/00* | (2009.01) | |
| *H04W 72/04* | (2009.01) | |
| *H04W 88/02* | (2009.01) | |
| *H04W 88/08* | (2009.01) | |
| *H04W 88/12* | (2009.01) | |
| *H04W 92/02* | (2009.01) | |
| *H04W 92/10* | (2009.01) | |
| *H04W 72/044* | (2023.01) | |

(52) U.S. Cl.
CPC ....... *H04W 52/228* (2013.01); *H04W 52/248* (2013.01); *H04W 52/283* (2013.01); *H04W 52/362* (2013.01); *H04W 52/58* (2013.01); *H04W 68/005* (2013.01); *H04W 72/0473* (2013.01); *H04W 88/02* (2013.01); *H04W 88/08* (2013.01); *H04W 88/12* (2013.01); *H04W 92/02* (2013.01); *H04W 92/10* (2013.01)

(58) Field of Classification Search
CPC ..... H04W 88/02; H04W 88/06; H04W 88/10; H04W 88/12; H04W 92/02; H04W 92/04; H04W 92/10
See application file for complete search history.

(56) References Cited

U.S. PATENT DOCUMENTS

| | | | | |
|---|---|---|---|---|
| 2012/0230249 | A1* | 9/2012 | Fukumoto | H04W 52/46 |
| 2014/0198743 | A1* | 7/2014 | Suzuki | H04W 52/18 |
| 2014/0301256 | A1 | 10/2014 | Yao et al. | |
| 2016/0142898 | A1 | 5/2016 | Poitau et al. | |
| 2016/0353440 | A1 | 12/2016 | Lee et al. | |

FOREIGN PATENT DOCUMENTS

| | | |
|---|---|---|
| JP | 2016-509799 A | 3/2016 |
| JP | 2017-513260 A | 5/2017 |
| WO | 2009/072178 A1 | 6/2009 |
| WO | 2009/129698 A1 | 10/2009 |
| WO | 2014/113537 A1 | 7/2014 |
| WO | 2015/116732 A1 | 8/2015 |
| WO | 2018/171443 A1 | 9/2018 |

OTHER PUBLICATIONS

Catt, "PUSCH Power Control In Multi-Beam Configuration", Agenda Item: 7.1.9, 3GPP TSG-RAN WG1 Meeting #89, R1-1707529, Hangzhou, China, May 15-19, 2017.

Notice of Reasons for Refusal issued by the Japan Patent Office for corresponding Japanese Patent Application No. 2019-524673, dated Oct. 20, 2020, with a full English machine translation.

Notice of Preliminary Rejection issued by the Korean Intellectual Property Office for corresponding Korean Patent Application No. 10-2019-7036362, dated Feb. 26, 2021, with an English translation.

3GPP TS 36.211 V14.2.0, "3rd Generation Partnership Project; Technical Specification Group Radio Access Network; Evolved Universal Terrestrial Radio Access (E-UTRA); Physical channels and modulation," (Release 14), Mar. 2017.

3GPP TS 36.212 V14.2.0, "3rd Generation Partnership Project; Technical Specification Group Radio Access Network; Evolved Universal Terrestrial Radio Access (E-UTRA); Multiplexing and channel coding," (Release 14), Mar. 2017.

3GPP TS 36.213 V14.2.0, "3rd Generation Partnership Project; Technical Specification Group Radio Access Network; Evolved Universal Terrestrial Radio Access (E-UTRA); Physical layer procedures," (Release 14), Mar. 2017.

3GPP TS 36.300 V14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2," (Release 14), Mar. 2017.

3GPP TS 36.321 V14.2.0, "3rd Generation Partnership Project; Technical Specification Group Radio Access Network; Evolved Universal Terrestrial Radio Access (E-UTRA); Medium Access Control (MAC) protocol specification," (Release 14), Mar. 2017.

3GPP TS 36.322 V14.0.0, "3rd Generation Partnership Project; Technical Specification Group Radio Access Network Evolved Universal Terrestrial Radio Access (E-UTRA); Radio Link Control (RLC) protocol specification," (Release 14), Mar. 2017.

3GPP TS 36.323 V14.2.0, "3rd Generation Partnership Project; Technical Specification Group Radio Access Network; Evolved Universal Terrestrial Radio Access (E-UTRA); Packet Data Convergence Protocol (PDCP) specification," (Release 14), Mar. 2017.

3GPP TS 36.331 V14.2.0, "3rd Generation Partnership Project; Technical Specification Group Radio Access Network; Evolved Universal Terrestrial Radio Access (E-UTRA); Radio Resouice Control (RRC); Protocol specification," (Release 14), Mar. 2017.

3GPP TS 36.413 V14.2.0, "3rd Generation Partnership Project; Technical Specification Group Radio Access Network; Evolved Universal Terrestrial Radio Access Network (E-UTRAN); S1 Application Protocol (S1AP)," (Release 14), Mar. 2017.

3GPP TS 36.423 V14.2.0, "3rd Generation Partnership Project; Technical Specification Group Radio Access Network; Evolved Universal Terrestrial Radio Access Network (E-UTRAN); X2 application protocol (X2AP)," (Release 14), Mar. 2017.

3GPP TS 36.425 V14.0.0, "3rd Generation Partnership Project; Technical Specification Group Radio Access Network; Evolved Universal Terrestrial Radio Access Network (E-UTRAN); X2 interface user plane protocol," (Release 14), Mar. 2017.

3GPP TR 38.801 V14.0.0, "3rd Generation Partnership Project; Technical Specification Group Radio Access Network; Study on new radio access technology: Radio access architecture and interfaces," (Release 14), Mar. 2017.

3GPP TR 38.802 V14.0.0, "3rd Generation Partnership Project; Technical Specification Group Radio Access Network; Study on New Radio Access Technology: Physical Layer Aspects," (Release 14), Mar. 2017.

3GPP TR 38.803 V14.0.0, "3rd Generation Partnership Project; Technical Specification Group Radio Access Network; Study on New Radio Access Technology: RF and co-existence aspects," (Release 14), Mar. 2017.

3GPP TR 38.804 V14.0.0, "3rd Generation Partnership Project; Technical Specification Group Radio Access Network; Study on New Radio Access Technology: Radio Interface Protocol Aspects," (Release 14), Mar. 2017.

3GPP TR 38.900 V14.2.0, "3rd Generation Partnership Project; Technical Specification Group Radio Access Network; Study on channel model for frequency spectrum above 6 GHz," (Release 14), Dec. 2016.

3GPP TR 38.912 V14.0.0, "3rd Generation Partnership Project; Technical Specification Group Radio Access Network; Study on New Radio (NR) access technology," (Release 14), Mar. 2017.

3GPP TR 38.913 V14.2.0, "3rd Generation Partnership Project; Technical Specification Group Radio Access Network; Study on Scenarios and Requirements for Next Generation Access Technologies;" (Release 14), Mar. 2017.

NTT DOCOMO,"New SID Proposal: Study on New Radio Access Technology," Agenda Item: 9.1, 3GPP TSG RAN Meeting #71, RP-160671, Goteborg, Sweden, Mar. 7-10, 2016.

Samsung, "Evaluation results of superposition scheme in case of multiplexing eMBB and URLLC", Agenda Item 3.1.2.2, 3GPP TSG-RAN WG1 Meeting #86bis, R1-1609058, Lisbon, Portugal, Oct. 10-14, 2016.

International Search Report and Written Opinion issued for corresponding International Patent Application No. PCT/JP2017/022208, dated Aug. 8, 2017 with partial English translation.

(56) References Cited

OTHER PUBLICATIONS

Examination Report issued by The Patent Office of India for corresponding Indian Patent Application No. 201937051459, electronically delivered on Sep. 10, 2021, with an English translation.
Communication pursuant to Article 94(3) EPC issued by the European Patent Office for corresponding European Patent Application No. 17 913 811.0-1205, dated Dec. 17, 2021.
First Notification of Office Action issued by the China National Intellectual Property Administration for corresponding Chinese Patent Application No. 201780091840.5, dated Jan. 6, 2022, with an English translation.

* cited by examiner

| TPC COMMAND | RELATIVE VALUE $\delta$ (dB) | ABSOLUTE VALUE $\delta$ (dB) |
| --- | --- | --- |
| 0 | -1 | -4 |
| 1 | 0 | -1 |
| 2 | 1 | 1 |
| 3 | 3 | 4 |

| TPC COMMAND | TYPE | VALUE $\delta$ (dB) |
|---|---|---|
| 0 | ABSOLUTE VALUE | -8 |
| 1 | | -4 |
| 2 | RELATIVE VALUE/ ABSOLUTE VALUE | -1 |
| 3 | | 0 |
| 4 | | 1 |
| 5 | | 3 |
| 6 | ABSOLUTE VALUE | 6 |
| 7 | | 10 |

BASE STATION DEVICE, TERMINAL DEVICE, WIRELESS COMMUNICATION SYSTEM, AND COMMUNICATION METHOD

CROSS-REFERENCE TO RELATED APPLICATION

This application is a continuation of International Application No. PCT/JP2017/022208, filed on Jun. 15, 2017 and designating the U.S., the entire contents of which are incorporated herein by reference.

FIELD

The present invention relates to a base station device, a terminal device, a wireless communication system, and a communication method.

BACKGROUND

In the current networks, traffics of mobile terminals (smartphones or feature phones) occupy the majority of network resources. Furthermore, traffics used by mobile terminals tend to increase in the future.

Moreover, there is a demand to handle services having various request conditions in accordance with the development of IoT (Internet of things) services (e.g., traffic system, a smart meter, a monitoring system for a device, etc.). Therefore, for the next-generation (e.g., 5G (fifth-generation mobile communication)) communication standards, there is a demand for a technology to achieve a higher data rate, a higher capacity, and a lower latency in addition to the 4G (fourth-generation mobile communication) standard technology (for example, Non Patent Literatures 1 to 11). Furthermore, with regard to the next-generation communication standard, the 3GPP working group (e.g., TSG-RAN WG1, TSG-RAN WG2) has studied technologies (Non Patent Literatures 12 to 18).

As described above, to handle various services, the 5G assumes the supports for many use cases classified as eMBB (Enhanced Mobile BroadBand), Massive MTC (Machine Type Communications), and URLLC (Ultra-Reliable and Low Latency Communication).

Furthermore, as for the 5G, to handle the above-described various services, there is a higher demand for wireless communications with regard to, for example, reliability or delay. For example, for the URLLC, there is a demand for ultrahigh reliability, that is, the error rate in the order of $10^{-5}$ in a wireless area, and the target delay in a wireless area is equal to or less than 0.5 milliseconds. Moreover, the delay of equal to or less than 0.5 milliseconds in a wireless area is a high demand, that is, less than $1/10$ of that in the 4G wireless system (LTE: Long Term Evolution).

Non Patent Literature 1: 3GPP TS 36.211 V14.2.0 (2017-03)
Non Patent Literature 2: 3GPP TS 36.212 V14.2.0 (2017-03)
Non Patent Literature 3: 3GPP TS 36.213 V14.2.0 (2017-03)
Non Patent Literature 4: 3GPP TS 36.300 V14.2.0 (2017-03)
Non Patent Literature 5: 3GPP TS 36.321 V14.2.0 (2017-03)
Non Patent Literature 6: 3GPP TS 36.322 V14.0.0 (2017-03)
Non Patent Literature 7: 3GPP TS 36.323 V14.2.0 (2017-03)
Non Patent Literature 8: 3GPP TS 36.331 V14.2.0 (2017-03)
Non Patent Literature 9: 3GPP TS 36.413 V14.2.0 (2017-03)
Non Patent Literature 10: 3GPP TS 36.423 V14.2.0 (2017-03)
Non Patent Literature 11: 3GPP TS 36.425 V14.0.0 (2017-03)
Non Patent Literature 12: 3GPP TR 38.801 V14.0.0 (2017-03)
Non Patent Literature 13: 3GPP TR 38.802 V14.0.0 (2017-03)
Non Patent Literature 14: 3GPP TR 38.803 V14.0.0 (2017-03)
Non Patent Literature 15: 3GPP TR 38.804 V14.0.0 (2017-03)
Non Patent Literature 16: 3GPP TR 38.900 V14.2.0 (2016-12)
Non Patent Literature 17: 3GPP TR 38.912 V14.0.0 (2017-03)
Non Patent Literature 18: 3GPP TR 38.913 V14.2.0 (2017-03)
Non Patent Literature 19: NTT DOCOMO, "New SID Proposal: Study on New Radio Access Technology", RP-160671, 3GPP TSG RAN Meeting #71, Goteborg, Sweden, 7-10 Mar. 2016

Furthermore, for the wireless communication system (e.g., 5G wireless communication system) in the future, it is desirable to conduct a wireless communication efficiently as compared with the existing wireless system. For example, the efficient wireless communication reduces the interference between simultaneously transmitted data and reduces the power consumption of a wireless communication device such as a base station device or a terminal device.

For example, in the 5G wireless communication system, there is a demand for the method for reducing the interference with data having a high level of priority (e.g., URLLC data) from the other data (e.g., eMBB data). Furthermore, although the interference between data is described as an example with regard to higher efficiency in the wireless communication system, it is obvious that efficient operation of the wireless communication system is demanded with regard to the other conditions (e.g., power consumption or transmission power).

SUMMARY

According to an aspect of an embodiment of the invention, a base station device includes: a controller configured to determine whether a calculation method for a single term among a plurality of terms included in an equation for determining a transmission power is either a first method or a second method; and a transmitter configured to transmit notification information for notifying the calculation method determined by the controller. The controller determines either the first method or the second method for first data, and determines either the first method or the second method for second data different from the first data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

With reference to the drawings, embodiments of a base station device, a terminal device, a wireless communication system, and a communication method disclosed in the subject application are described below in detail. Furthermore, the present invention is not limited to the embodiments.

[a] First Embodiment

Figure 1:
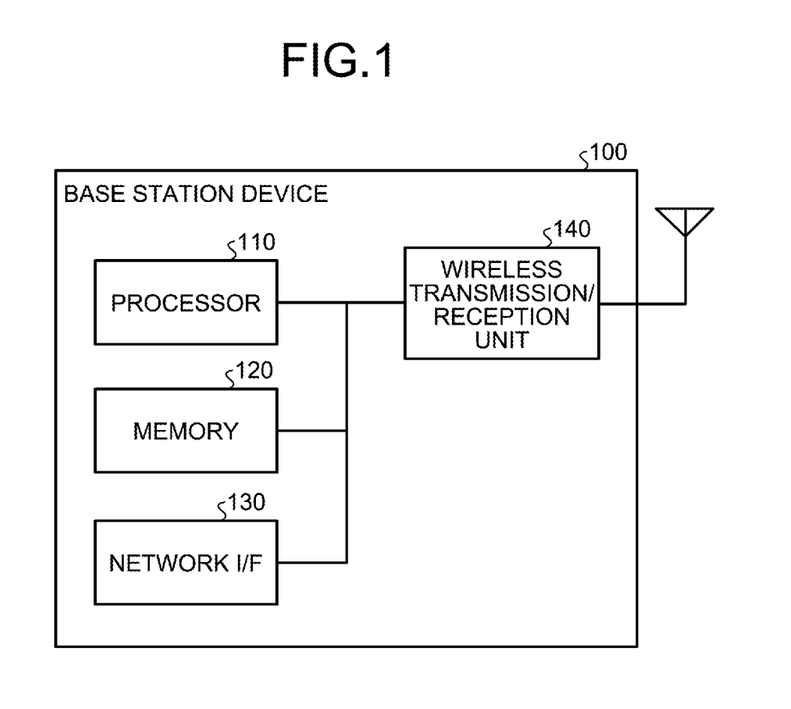
FIG. 1 is a block diagram that illustrates a configuration of a base station device according to a first embodiment.

FIG. 1 is a block diagram that illustrates a configuration of a base station device 100 according to a first embodiment. The base station device 100 illustrated in FIG. 1 includes a processor 110, a memory 120, a network interface (hereinafter abbreviated as "network I/F") 130, and a wireless transmission/reception unit 140.

The processor 110 includes, for example, a CPU (Central Processing Unit), an FPGA (Field Programmable Gate Array), or a DSP (Digital Signal Processor) to control the overall base station device 100 in an integrated manner. Furthermore, the processor 110 determines the method for calculating a single term among a plurality of terms included in the equation for determining the transmission power of the terminal device, which is the other end of the communication, during the communication (in the middle of the communication).

Specifically, in a case where a transmission power $P_{UE}$ of the terminal device is calculated by using, for example, Equation (1) below, $$P_{UE} = x_1 + x_2 + \ldots + x_n \quad (1)$$

for example, the processor 110 determines whether the method for calculating the term $x_n$ is a first method or a second method. Here, in the above Equation (1), each of $x_1$ to $x_n$ represents a term. Furthermore, the term $x_n$ is a term related to the value designated by the base station device 100 using, for example, a transmission power control command (hereinafter referred to as "TPC command").

The processor 110 determines whether the term $x_n$ in the above Equation (1) is calculated by using the first method using a relative value based on the previous value or calculated by using the second method using the absolute value that is irrelevant to the previous value. The processor 110 makes this determination in the middle of the communication as well as at the start time of the communication with the terminal device. That is, the processor 110 switches the method for calculating the transmission power of the terminal device in the middle of the communication.

The transmission power $P_{UE}$ of the terminal device may be moderately changed in a case where the term $x_n$ is calculated by using the first method using the relative value, while the transmission power $P_{UE}$ of the terminal device may be rapidly changed in a case where the term $x_n$ is calculated by using the second method using the absolute value.

The memory 120 includes, for example, a RAM (Random Access Memory) or a ROM (Read Only Memory) to store various types of information when the processor 110 executes a process.

The network I/F 130 is an interface for connecting to a higher-level network so as to communicate with, for example, a base station device in an adjacent cell via the higher-level network.

The wireless transmission/reception unit 140 transmits and receives a wireless signal to and from the terminal device. Specifically, the wireless transmission/reception unit 140 transmits a wireless signal to the terminal device via an antenna and receives a wireless signal transmitted from the terminal device via the antenna. Furthermore, when the processor 110 determines the method for calculating the single term included in the equation for determining the transmission power of the terminal device, the wireless transmission/reception unit 140 generates the notification information for notifying the method and transmits it to the terminal device. Specifically, the wireless transmission/reception unit 140 transmits the notification information indicating, for example, the term $x_n$ in the above Equation (1) is calculated by using the first method or calculated by using the second method to the terminal device.

Figure 2:
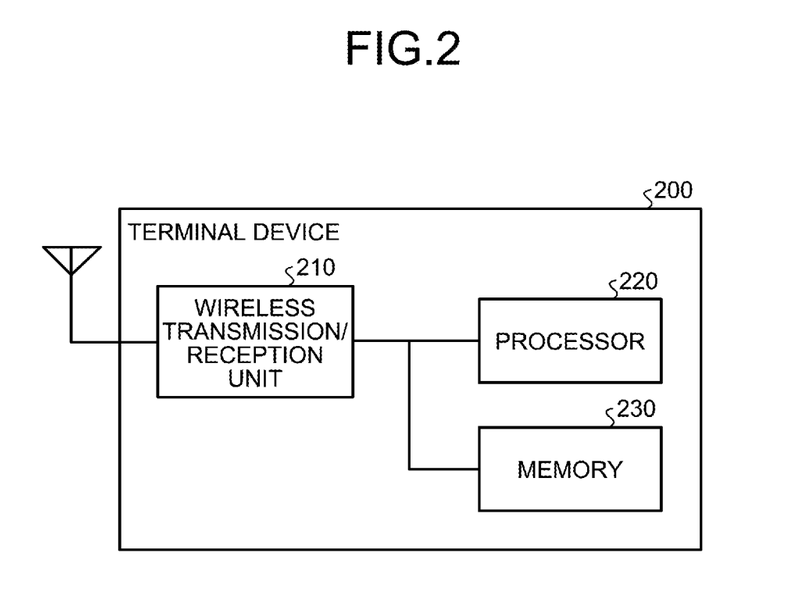
FIG. 2 is a block diagram that illustrates a configuration of a terminal device according to the first embodiment.

FIG. 2 is a block diagram that illustrates a configuration of a terminal device 200 according to the first embodiment. The terminal device 200 illustrated in FIG. 2 includes a wireless transmission/reception unit 210, a processor 220, and a memory 230.

The wireless transmission/reception unit 210 transmits and receives a wireless signal to and from the base station device 100. That is, the wireless transmission/reception unit 210 transmits a wireless signal to the base station device 100 via an antenna and receives a wireless signal transmitted from the base station device 100 via the antenna. Specifically, the wireless transmission/reception unit 210 receives, from the base station device 100, the notification information for notifying, for example, the method for calculating the single term included in the equation for determining the transmission power.

The processor 220 includes, for example, a CPU, an FPGA, or a DSP to control the overall terminal device 200 in an integrated manner. Furthermore, the processor 220 controls the transmission power of a wireless signal transmitted from the wireless transmission/reception unit 210. Specifically, the processor 220 calculates the transmission power by using the equation for determining the transmission power and sets the calculated transmission power in the wireless transmission/reception unit 210. At this point, the processor 220 calculates the transmission power by using for example the above Equation (1) and, for the term $x_n$ in Equation (1), performs the calculation in accordance with the notification information received by the wireless transmission/reception unit 210. That is, the processor 220 calculates the term $x_n$ in Equation (1) by using the first method or the second method in accordance with the notification information.

The memory 230 includes for example a RAM or a ROM to store various types of information when the processor 220 executes a process.

Figure 3:
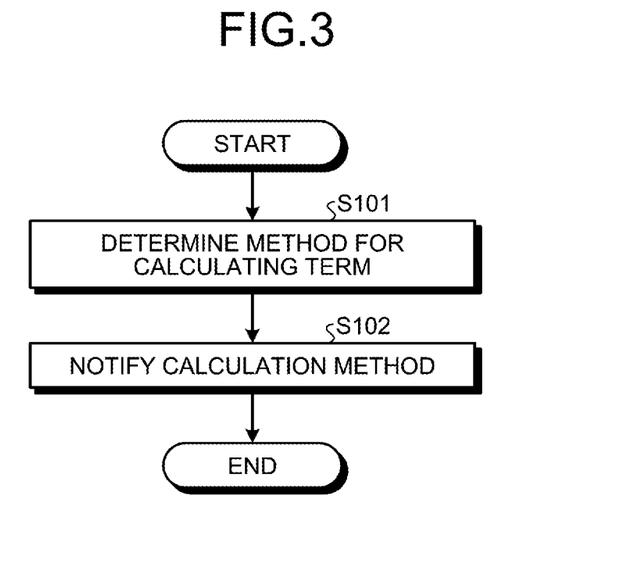
FIG. 3 is a flowchart that illustrates an operation of the base station device according to the first embodiment.

Next, with reference to the flowchart illustrated in FIG. 3, the uplink transmission power control of the wireless communication system including the base station device 100 and the terminal device 200 having the above-described configuration is described.

The processor 110 in the base station device 100 determines whether the method for calculating the single term included in the equation for determining the transmission power of the terminal device 200 is the first method or the second method (Step S101). The single term for which a calculation method is determined is, for example, the term $x_n$ in the above Equation (1) or may be a term related to the value designated by using a TPC command. Furthermore, the first method is a method for calculating the term by using a relative value, and the second method is a method for calculating the term by using an absolute value.

After the processor 110 determines the method for calculating the term $x_n$, the notification information for notifying the calculation method is generated, and the notification information is transmitted to the terminal device 200 by the wireless transmission/reception unit 140. Thus, the terminal device 200 is notified of the method for calculating the term $x_n$ (Step S102).

The wireless transmission/reception unit 210 in the terminal device 200 receives the transmitted notification information. Then, to execute the calculation of the transmission power using Equation (1), the processor 220 calculates the term $x_n$ by using the first method or the second method in accordance with the notification information. The transmission power calculated by the processor 220 is set in the wireless transmission/reception unit 210 so that the transmission power of a signal transmitted from the wireless transmission/reception unit 210 is controlled.

In a case where the first method is used as the method for calculating the term $x_n$, the term $x_n$ is calculated as a relative value based on the previous value so that the transmission power is moderately changed. Conversely, in a case where the second method is used as the method for calculating the term $x_n$, the term $x_n$ is calculated as an absolute value that is irrelevant to the previous value so that the transmission power may be rapidly changed. For example, after the transmission power is moderately increased during the time period in which the first method is used, the notification information causes the method for calculating the term $x_n$ to switch to the second method so that the increased transmission power may be rapidly decreased. Thus, when the transmission power needs to be increased or decreased to a large extent, the method for calculating the term $x_n$ is switched to the second method using the absolute value, whereby the time it takes to meet the target transmission power may be shortened.

As described above, according to the present embodiment, it is determined whether the single term included in the equation for determining the transmission power of the terminal device is calculated by using the first method or the second method, and the determined calculation method is notified to the terminal device. Thus, the method for calculating the transmission power of the terminal device may be switched depending on a situation. As a result, the time it takes to meet the target transmission power may be shortened, and the wireless communication may be efficiently conducted.

[b] Second Embodiment

The feature of a second embodiment is that the method for calculating the transmission power of the terminal device is switched in a case where the wireless environment between the base station device and the terminal device is rapidly changed.

Figure 4:
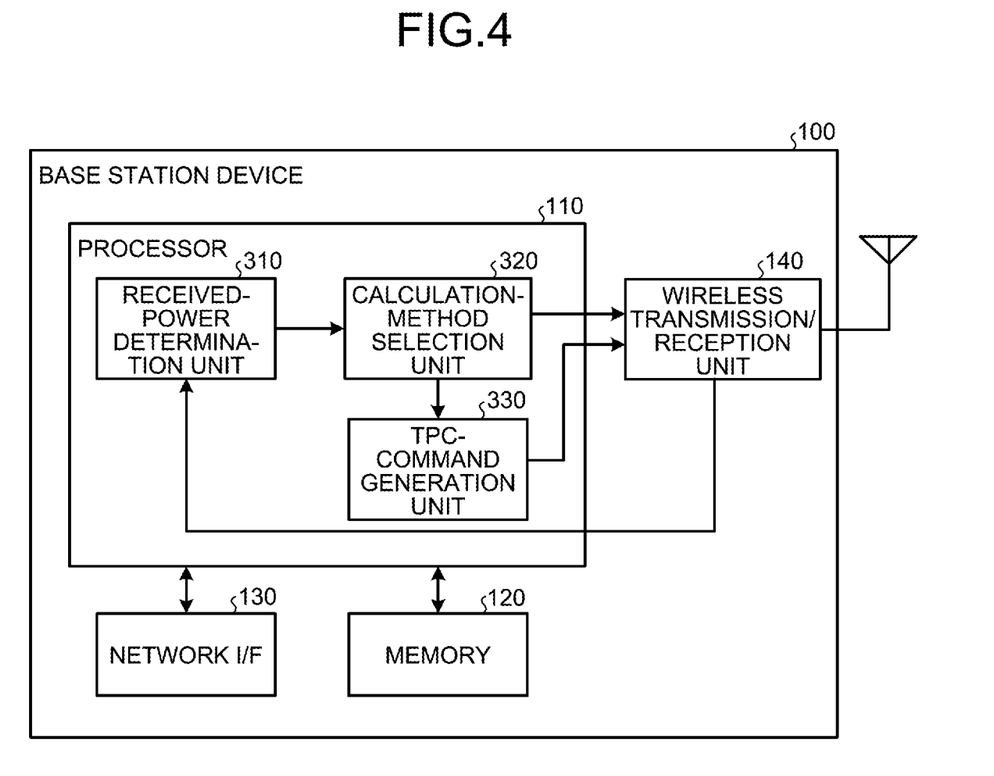
FIG. 4 is a block diagram that illustrates a configuration of the base station device according to a second embodiment.

FIG. 4 is a block diagram that illustrates a configuration of the base station device 100 according to the second embodiment. In FIG. 4, the same part as that in FIG. 1 is denoted by the same reference numeral, and its description is omitted. Furthermore, as the configuration of the terminal device 200 according to the second embodiment is the same as that in the first embodiment (FIG. 2), its description is omitted.

As illustrated in FIG. 4, according to the second embodiment, the processor 110 includes a received-power determination unit 310, a calculation-method selection unit 320, and a TPC-command generation unit 330.

The received-power determination unit 310 monitors the received power of the signal received from the terminal device 200 to determine whether the received power has changed to a large extent. Specifically, the received-power determination unit 310 calculates the difference between the received power of the current sub-frame of the signal received from the terminal device 200 and the received power of the previous sub-frame by a predetermined time period to determine whether the calculated difference is more than a predetermined threshold. Then, when the calculated difference is more than the predetermined threshold, the received-power determination unit 310 determines that the received power has changed to a large extent. Such a large change in the received power occurs when, for example, the presence or absence of an obstacle between the base station device 100 and the terminal device 200 has changed due to the movement of the terminal device 200.

The calculation-method selection unit 320 selects the method for calculating the single term included in the equation for determining the transmission power of the terminal device 200 in accordance with a received-power determination result by the received-power determination unit 310. Specifically, the calculation-method selection unit 320 makes a selection as to whether the single term in the equation for determining the transmission power is calculated by using the first method using the relative value based on the previous value or is calculated by using the second method using the absolute value that is irrelevant to the previous value.

Here, a transmission power $P_{UE}(i)$ of a sub-frame i for the terminal device 200 is determined by using, for example, Equation (2) below.

$$P_{UE}(i) = \min\left\{ \begin{array}{c} P_{MAX}(i) \\ 10\log_{10}(M(i)) + P_0(j) + \alpha(j)PL + \Delta(i) + f(i) \end{array} \right\} \quad (2)$$

In Equation (2), min{A,B} represents the minimum value of A and B, and $P_{MAX}(i)$ represents a predetermined maximum transmission power. Furthermore, M(i) is a term corresponding to the frequency band of a channel, and $P_0(j)$ represents the transmission power of a sub-frame j previous to the sub-frame i. $\alpha(j)PL$ represents the path loss of the sub-frame j, Δ(i) is a term corresponding to MCS, and f(i) is a term including the value designated by a TPC command.

The calculation-method selection unit 320 makes a selection as to whether the method for calculating the term f(i) designated by the TPC command among the terms included in the above Equation (2) is the first method or the second method. Specifically, the calculation-method selection unit 320 selects the first method using the relative value in a case where the received-power determination unit 310 determines that the received power has not changed to a large extent. Furthermore, the calculation-method selection unit 320 selects the second method using the absolute value in a case where the received power determination unit 310 determines that the received power has changed to a large extent.

In a case where the method for calculating the term f(i) is the first method, the term f(i) is calculated by using the relative value; therefore, the relative value designated by the TPC command is added to a previous term f(i−1) to calculate the term f(i). Conversely, in a case where the method for calculating the term f(i) is the second method, the term f(i) is calculated by using the absolute value; therefore, the term f(i) is calculated by using the absolute value designated by the TPC command.

The wireless transmission/reception unit 140 notifies the terminal device 200 of the notification information as to which one of the first method and the second method has been selected by the calculation-method selection unit 320. At this point, the wireless transmission/reception unit 140 may transmit the notification information to the terminal device 200 by, for example, RRC (Radio Resource Control) signaling.

The TPC-command generation unit 330 generates a TPC command in accordance with the method for calculating the term f(i) selected by the calculation-method selection unit 320. Specifically, the TPC-command generation unit 330 generates a TPC command for designating the relative value to be added to the previous term f(i−1) by one sub-frame in a case where the calculation-method selection unit 320 has selected the first method. Conversely, the TPC-command generation unit 330 generates the TPC command for designating the absolute value of the transmission power in a case where the calculation-method selection unit 320 has selected the second method. The TPC command generated by the TPC-command generation unit 330 is transmitted from the wireless transmission/reception unit 140 to the terminal device 200.

Figure 5:
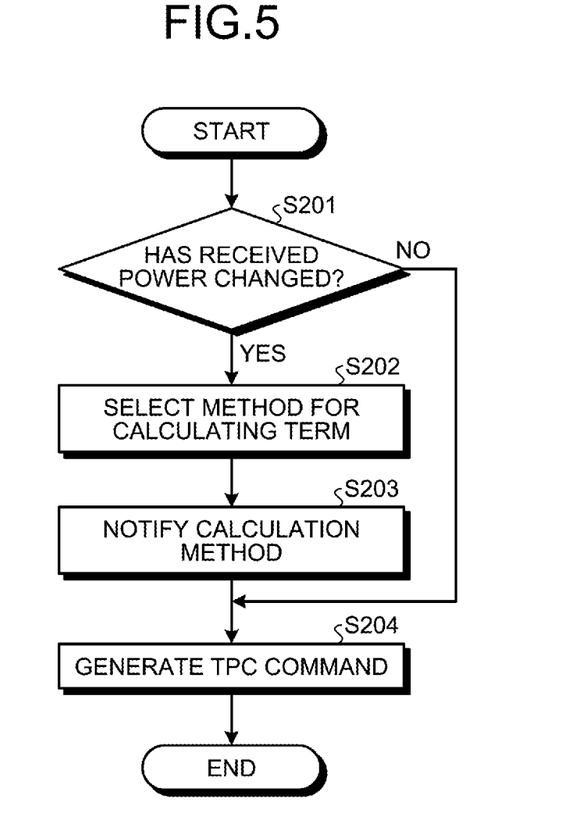
FIG. 5 is a flowchart that illustrates an operation of the base station device according to the second embodiment.

Next, the operation of the base station device 100 having the above-described configuration is described with reference to the flowchart illustrated in FIG. 5. It is assumed below that the base station device 100 and the terminal device 200 perform wireless communications and, in the initial state, the terminal device 200 calculates the term f(i) in the above Equation (2) by using the first method using the relative value and determines the transmission power.

The received-power determination unit 310 constantly monitors the received power of a signal received by the wireless transmission/reception unit 140 from the terminal device 200 (Step S201). Then, for example, in a case where the difference between the received power of the current sub-frame and the received power of the previous sub-frame by a predetermined time period is less than a predetermined threshold, it is determined that a change in the received power is small (No at Step S201). In this case, as the term f(i) is continuously calculated by using the first method, the TPC-command generation unit 330 generates the TPC command for designating the relative value (Step S204). The generated TPC command is transmitted from the wireless transmission/reception unit 140 to the terminal device 200. Then, the terminal device 200 adds the relative value designated by the TPC command to the previous term f(i−1) by one sub-frame to calculate the term f(i) and determines the transmission power by using the above Equation (2).

Figure 6:
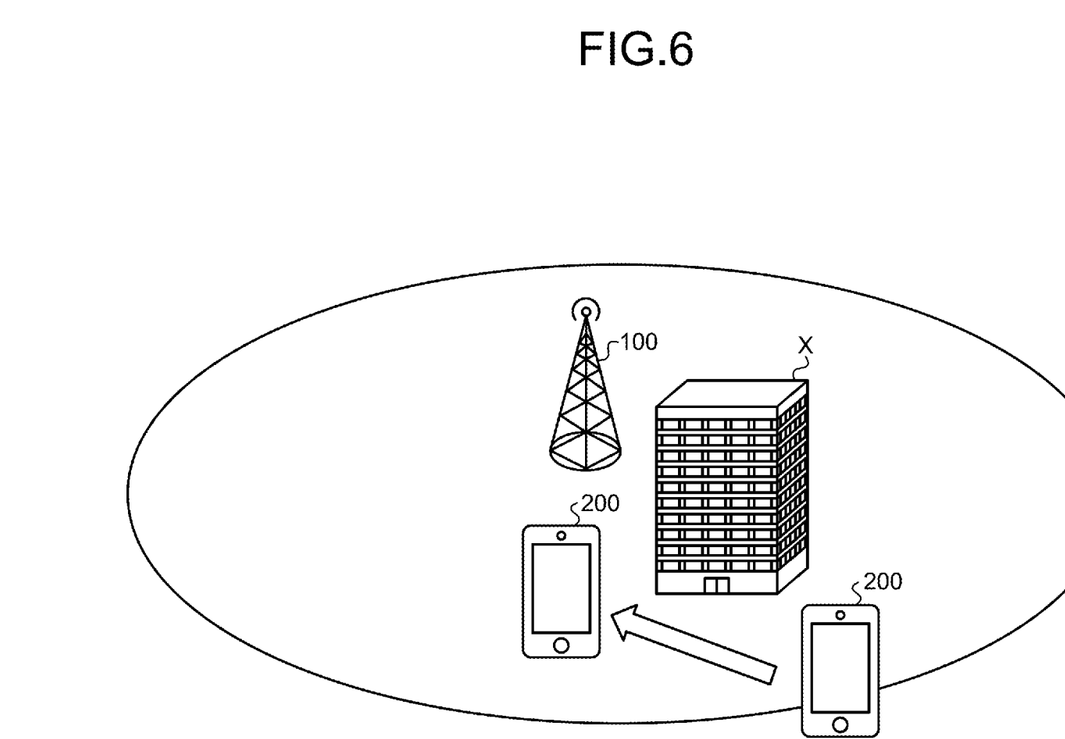
FIG. 6 is a diagram that illustrates a specific example of a change in a communication environment.

Conversely, for example, in a case where the difference between the received power of the current sub-frame and the received power of the previous sub-frame by a predetermined time period is equal to or more than the predetermined threshold, it is determined that a change in the received power is large (Yes at Step S201). Such a change in the received power occurs when the presence or absence of an obstacle X between the base station device 100 and the terminal device 200 has changed due to the movement of the terminal device 200, as illustrated in, for example, FIG. 6. Specifically, in the example illustrated in FIG. 6, as the obstacle X is not present between the base station device 100 and the terminal device 200 due to the movement of the terminal device 200, the received power of the base station device 100 increases as long as the transmission power of the terminal device 200 is constant. When the communication environment rapidly changes as described above, it is preferable that the transmission power of the terminal device 200 is rapidly changed instead of being moderately changed.

Therefore, in a case where a change in the received power is large, the calculation-method selection unit 320 selects the second method using the absolute value as the method for calculating the term f(i) in the above Equation (2) (Step S202). Then, the wireless transmission/reception unit 140 notifies the terminal device of the notification information that the second method has been selected (Step S203). Furthermore, the notification that the term f(i) is calculated by using the second method using the absolute value is also made to the TPC-command generation unit 330.

Figure 7:
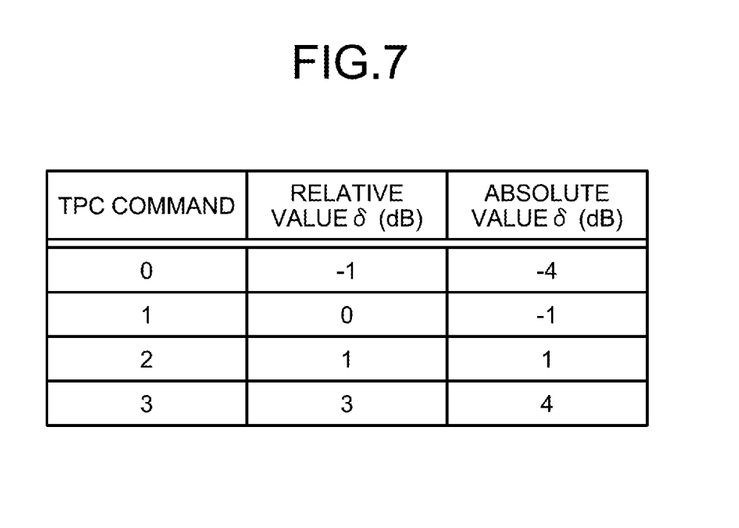
FIG. 7 is a diagram that illustrates specific examples of a value designated by a TPC command.

Then, the TPC-command generation unit 330 generates a TPC command for designating the absolute value (Step S204). Furthermore, TPC commands generated by the TPC-command generation unit 330 may be common between a case where a relative value is designated and a case where an absolute value is designated. Specifically, as illustrated in for example FIG. 7, each TPC command may be related to both a relative value and an absolute value. In the example illustrated in FIG. 7, for example, a TPC command "0" designates "−1 dB" as a relative value when the first method is selected as the method for calculating the term f(i) and designates "−4 dB" as an absolute value when the second method is selected as the method for calculating the term f(i). Thus, as a common TPC command is used in a case where a relative value is designated and in a case where an absolute value is designated, an increase in the number of bits assigned to TPC commands may be prevented, and the overhead of a control channel for transmitting a TPC command may be reduced.

The generated TPC command is transmitted from the wireless transmission/reception unit 140 to the terminal device 200. Then, the terminal device 200 calculates the term f(i) based on the absolute value designated by the TPC command and determines the transmission power by using the above Equation (2). Here, as the term f(i) is calculated based on the absolute value, the transmission power, which is gradually increased during the time period in which, for example, the first method using the relative value is selected, may be rapidly decreased. Therefore, for example, when an obstacle disappears between the base station device 100 and the terminal device 200, the excessive transmission power of the terminal device 200 may be rapidly decreased so that the interference with the circumference may be promptly reduced. Furthermore, as the time period during which the terminal device 200 conducts transmission with the excessive transmission power is reduced, the power consumption of the terminal device 200 may be reduced.

As described above, according to the present embodiment, it is determined whether the single term included in the equation for determining the transmission power of the terminal device is calculated by using the first method or the second method depending on whether the received power of the signal received from the terminal device has changed to a large extent, and the determined calculation method is notified to the terminal device. Thus, the method for calculating the transmission power of the terminal device may be switched in accordance with a change in the communication environment between the base station device and the terminal device. As a result, for example, when an obstacle disappears between the base station device and the terminal device, the interference with the circumference due to the terminal device may be promptly reduced, and the wireless communication may be efficiently conducted.

[c] Third Embodiment

The feature of the third embodiment is that, when URLLC data is transmitted, the method for calculating the transmission power of the terminal device that transmits eMBB data is switched.

Figure 8:
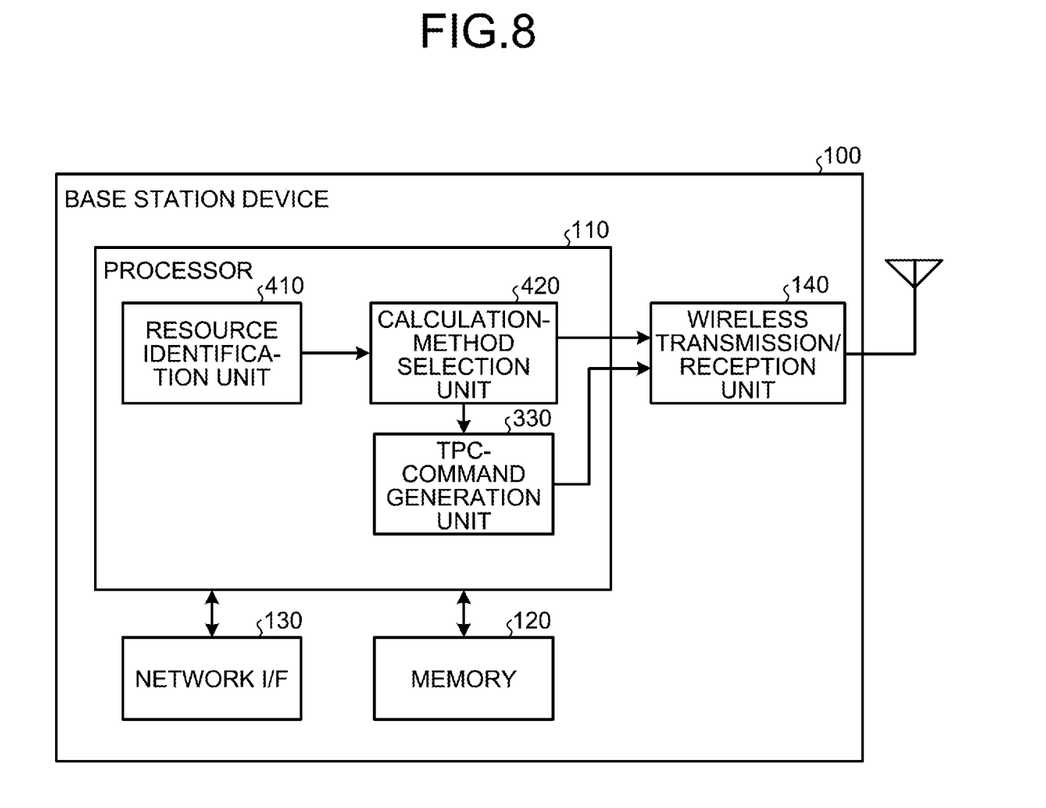
FIG. 8 is a block diagram that illustrates a configuration of the base station device according to a third embodiment.

FIG. 8 is a block diagram that illustrates a configuration of the base station device 100 according to the third embodiment. In FIG. 8, the same part as those in FIG. 1 and FIG. 4 is denoted by the same reference numeral, and its description is omitted. Furthermore, as the configuration of the terminal device 200 according to the third embodiment is the same as that in the first embodiment (FIG. 2), its description is omitted.

As illustrated in FIG. 8, according to the third embodiment, the processor 110 includes a resource identification unit 410, a calculation-method selection unit 420, and the TPC-command generation unit 330.

The resource identification unit 410 identifies the resource with which the terminal device 200 (hereinafter referred to as "URLLC terminal 200-1"), which transmits and receives URLLC data having a high level of priority as compared with the other data among the terminal devices 200 that are communicating with the base station device 100, transmits URLLC data. Specifically, the resource identification unit 410 identifies the frequency and the time used by the URLLC terminal 200-1 to transmit the URLLC data. The resource used to transmit the URLLC data may be previously determined, e.g., a predetermined frequency band and a predetermined time in each sub-frame.

The calculation-method selection unit 420 selects the method for calculating the single term included in the equation for determining the transmission power of the terminal device 200 on the basis of the resource identified by the resource identification unit 410. Specifically, the calculation-method selection unit 420 makes a selection as to whether the single term in the equation for determining the transmission power is calculated by using the first method using the relative value based on the previous value or calculated by using the second method using the absolute value that is irrelevant to the previous value. Furthermore, the equation for determining the transmission power may be the same as, for example, the above Equation (2).

The calculation-method selection unit 420 selects the first method using the relative value for the resources other than the resource with which URLLC data is transmitted. Furthermore, the calculation-method selection unit 420 selects the second method using the absolute value for the resource with which URLLC data is transmitted. The wireless transmission/reception unit 140 notifies the terminal device 200 other than the URLLC terminal 200-1 of the notification information as to which one of the first method and the second method the calculation-method selection unit 420 has selected. That is, the notification information is transmitted to for example the terminal device 200 (hereinafter, referred to as "eMBB terminal 200-2") that transmits and receives eMBB data having a lower level of priority as compared with URLLC data. At this point, the wireless transmission/reception unit 140 may transmit the notification information to the eMBB terminal 200-2 by, for example, RRC signaling.

Figure 9:
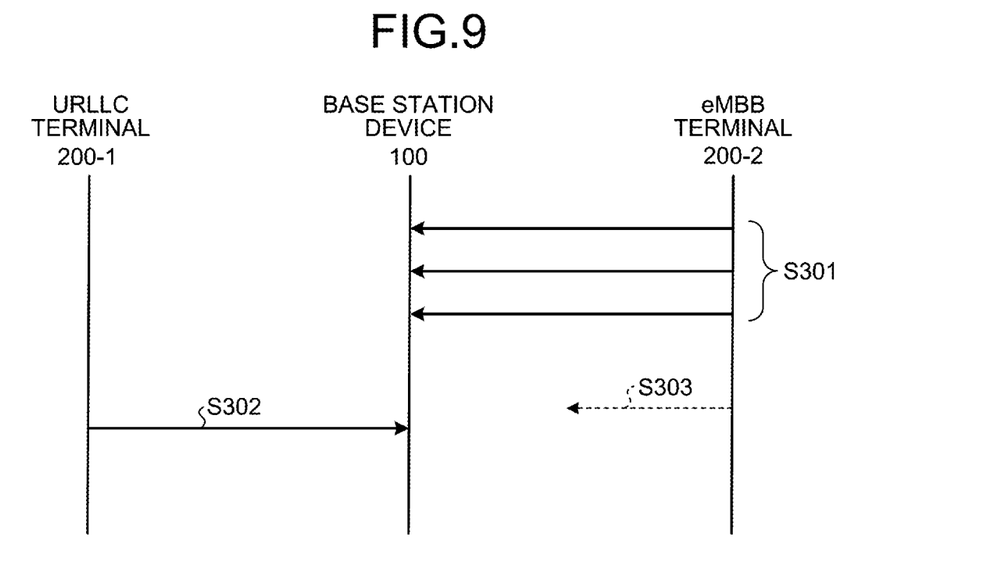
FIG. 9 is a sequence diagram that illustrates an operation of a wireless communication system according to the third embodiment.

Next, with reference to the sequence diagram illustrated in FIG. 9, the uplink transmission power control of the wireless communication system including the base station device 100, the URLLC terminal 200-1, and the eMBB terminal 200-2 having the above-described configuration is described.

According to the third embodiment, the resource identification unit 410 identifies the resource used by the URLLC terminal 200-1 to transmit URLLC data. Specifically, the resource identification unit 410 identifies the timing in which the URLLC terminal 200-1 transmits URLLC data.

Furthermore, the first method using the relative value is selected by the calculation-method selection unit 420 for the resource that is not used to transmit URLLC data, and the notification information on the selected calculation method is notified to the eMBB terminal 200-2. Therefore, when the URLLC terminal 200-1 does not transmit URLLC data, the eMBB terminal 200-2 calculates the single term included in the equation for determining the transmission power and related to for example the TPC command by using the first method to determine the transmission power. Then, the eMBB terminal 200-2 transmits eMBB data with the determined transmission power (Step S301).

Then, when it is close to the timing in which the URLLC terminal 200-1 transmits URLLC data, the second method using the absolute value is selected by the calculation-method selection unit 420, and the notification information on the selected calculation method is notified to the eMBB terminal 200-2. Therefore, the eMBB terminal 200-2 calculates the single term included in the equation for determining the transmission power and related to for example the TPC command by using the second method to determine the transmission power. Here, as the single term is calculated based on the absolute value designated by the TPC command, the transmission power, which is gradually increased during the time period in which, for example, the first method using the relative value is selected, may be rapidly decreased. Thus, when the URLLC terminal 200-1 transmits URLLC data (Step S302), the eMBB terminal 200-2 transmits eMBB data with a small transmission power (Step S303), whereby the interference with URLLC data due to eMBB data may be reduced.

As described above, according to the present embodiment, it is determined whether the single term included in the equation for determining the transmission power of the terminal device is calculated by using the first method or the second method depending on whether it is the resource used to transmit data having a high level of priority. Then, the determined calculation method is notified to a terminal device that transmits data having a low level of priority. Thus, with regard to the frequency and the time to transmit data having a high level of priority, the method for calculating the transmission power of the terminal device that transmits the other data may be switched. As a result, when data having a high level of priority is transmitted, the interference from the other data may be reduced, and the wireless communication may be conducted efficiently.

[d] Fourth Embodiment

The feature of the fourth embodiment is that, when URLLC data is transmitted, the method for calculating the transmission power of the terminal device that transmits eMBB data in a different cell is switched.

Figure 10:
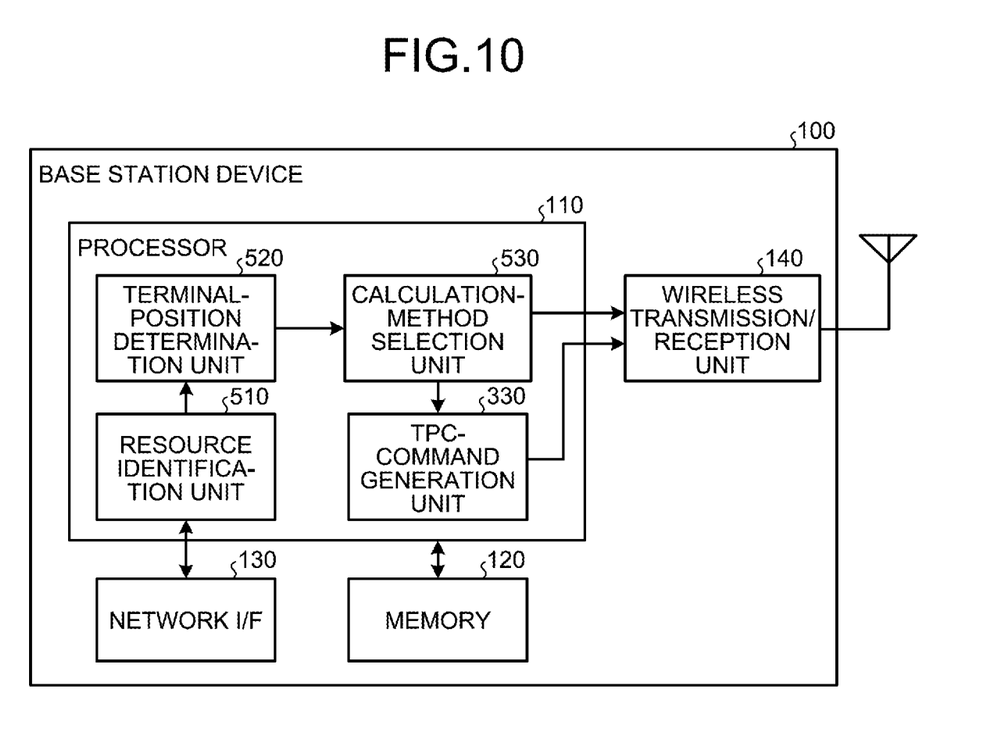
FIG. 10 is a block diagram that illustrates a configuration of the base station device according to a fourth embodiment.

FIG. 10 is a block diagram that illustrates a configuration of the base station device 100 according to the fourth embodiment. In FIG. 10, the same part as those in FIG. 1 and FIG. 4 is denoted by the same reference numeral, and its description is omitted. Furthermore, as the configuration of the terminal device 200 according to the fourth embodiment is the same as that in the first embodiment (FIG. 2), its description is omitted.

As illustrated in FIG. 10, according to the fourth embodiment, the processor 110 includes a resource identification unit 510, a terminal-position determination unit 520, a calculation-method selection unit 530, and the TPC-command generation unit 330.

The resource identification unit 510 receives the resource information indicating the assignment of a resource in an adjacent cell from the base station device in the adjacent cell via the network I/F 130 to identify the resource used to transmit URLLC data having a high level of priority as compared with the other data in the adjacent cell. That is, the resource identification unit 510 identifies the frequency and the time used to transmit URLLC data in the adjacent cell.

The terminal-position determination unit 520 determines whether each of the terminal devices 200 in its own cell is located close to an adjacent cell in which URLLC data is transmitted. Specifically, the terminal-position determination unit 520 determines whether the terminal device 200 is located near the center of its own cell or located near the cell edge of its own cell. Here, the terminal-position determination unit 520 may estimate the distance from the base station device 100 to the terminal device 200 on the basis of for example the received power of the signal received from each of the terminal devices 200 to determine the position of the terminal device 200. While the interference caused to the adjacent cell by the terminal device 200 located near the center of its own cell is relatively small, the interference caused to the adjacent cell by the terminal device 200 located near the cell edge of its own cell is relatively large.

The calculation-method selection unit 530 selects the method for calculating the single term included in the equation for determining the transmission power of the terminal device 200 on the basis of the resource identified by the resource identification unit 510 and the position of the terminal device 200 determined by the terminal-position determination unit 520. Specifically, the calculation-method selection unit 530 makes a selection as to whether the single term in the equation for determining the transmission power is calculated by using the first method using the relative value based on the previous value or calculated by using the second method using the absolute value that is irrelevant to the previous value. Furthermore, the equation for determining the transmission power may be the same as, for example, the above Equation (2).

The calculation-method selection unit 530 selects the first method using the relative value for resources other than the resource with which URLLC data is transmitted. Furthermore, the calculation-method selection unit 530 selects the first method using the relative value for the terminal device 200 that is positioned near the center of its own cell and away from an adjacent cell. Conversely, the calculation-method selection unit 530 selects the second method using the absolute value for the terminal device 200 that is positioned near the cell edge of its own cell with regard to the resource with which URLLC data is transmitted. In other words, the calculation-method selection unit 530 selects the first method for the terminal device 200 whose distance from the base station device 100 is less than a predetermined distance and selects the second method for the terminal device 200 whose distance from the base station device 100 is equal to or more than the predetermined distance. The wireless transmission/reception unit 140 notifies the terminal device 200 in its own cell of the notification information as to which one of the first method and the second method has been selected by the calculation-method selection unit 530. At this point, the wireless transmission/reception unit 140 may transmit the notification information to the terminal device 200 by for example RRC signaling.

Figure 11:
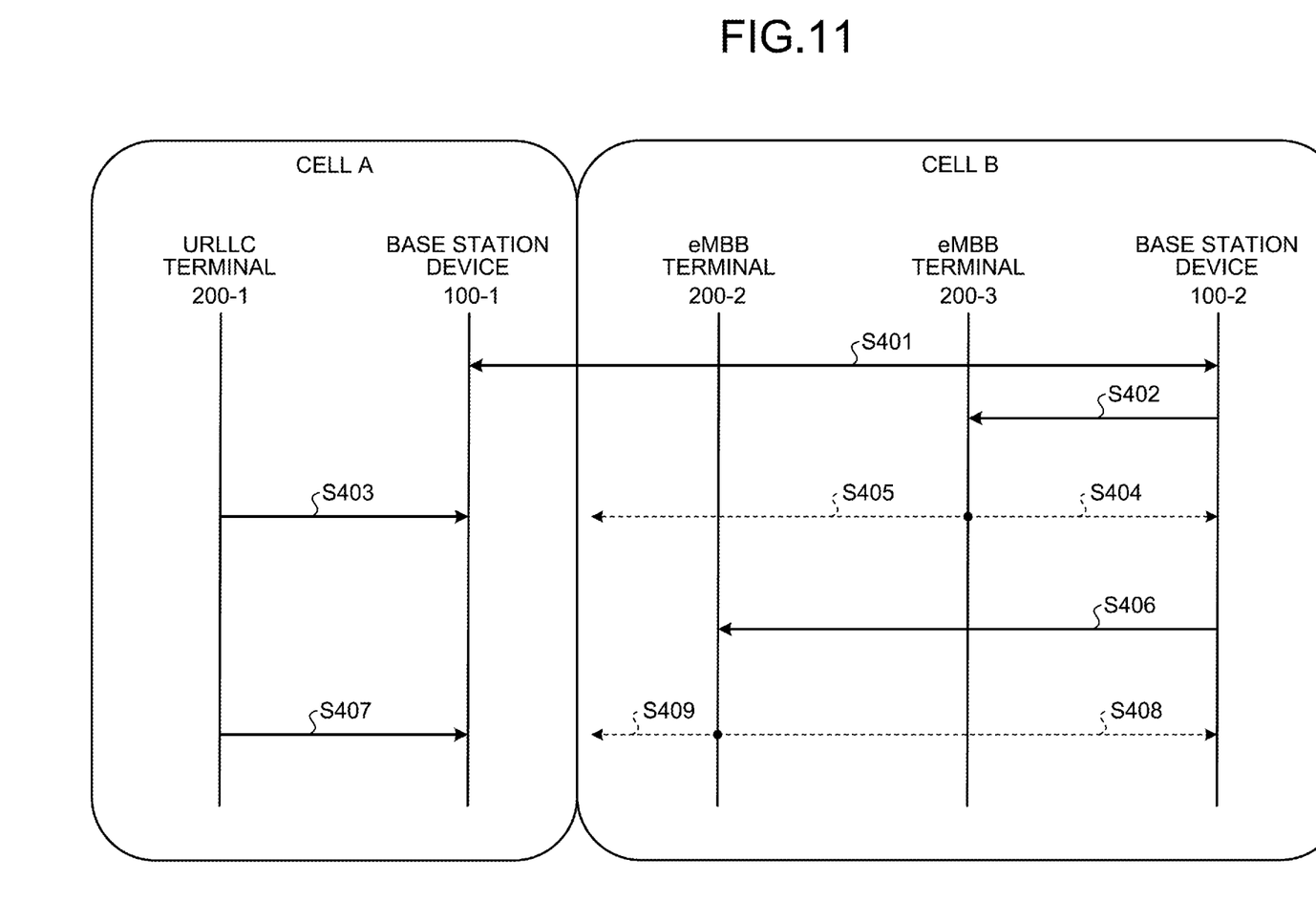
FIG. 11 is a sequence diagram that illustrates an operation of a wireless communication system according to the fourth embodiment.

Next, the uplink transmission power control of the wireless communication system including the base station device 100 and the terminal device 200 having the above-described configuration is described with reference to the sequence diagram illustrated in FIG. 11. In the description below, it is assumed that the URLLC terminal 200-1, which transmits and receives URLLC data, belongs to a cell A formed by the base station device 100-1 and the eMBB terminals 200-2, 200-3, which transmit and receive eMBB data, belong to a cell B formed by the base station device 100-2.

According to the fourth embodiment, the base station devices 100-1, 100-2 exchange the resource information indicating the assignment of resources in the respective cells (Step S401). Therefore, the resource information indicating the resource used in the cell A to transmit URLLC data is received by the network I/F 130 of the base station device 100-2 in the cell B and is acquired by the resource identification unit 510. Then, the resource identification unit 510 identifies the timing in which the URLLC terminal 200-1 transmits URLLC data in the cell A, which is an adjacent cell.

Furthermore, the terminal-position determination unit 520 determines the positions of the eMBB terminals 200-2, 200-3 in the cell B, which is its own cell. Here, it is assumed that the eMBB terminal 200-2 is positioned near the cell edge of the cell B and is located close to the cell A and the eMBB terminal 200-3 is positioned near the center of the cell B and is located away from the cell A.

As the eMBB terminal 200-3 is located away from the cell A, the calculation-method selection unit 530 selects the first method for the eMBB terminal 200-3. Then, the wireless transmission/reception unit 140 transmits the notification information for notifying the first method using the relative value to the eMBB terminal 200-3 (Step S402). Therefore, the eMBB terminal 200-3 calculates the single term included in the equation for determining the transmission power and related to for example the TPC command by using the first method to determine the transmission power. Then, when the URLLC terminal 200-1 transmits URLLC data in the cell A (Step S403), the eMBB terminal 200-3 in the cell B transmits eMBB data with the transmission power determined by using the first method (Step S404). At this point, as the eMBB terminal 200-3 is located away from the cell A, the interference caused to URLLC data in the cell A is relatively small even though the transmission power of eMBB data is determined by using the first method using the relative value (Step S405).

Conversely, as the eMBB terminal 200-2 is located close to the cell A, the calculation-method selection unit 530 selects the second method for the eMBB terminal 200-2. Then, the wireless transmission/reception unit 140 transmits the notification information for notifying the second method using the absolute value to the eMBB terminal 200-2 (Step S406). Therefore, the eMBB terminal 200-2 calculates the single term included in the equation for determining the transmission power and related to for example the TPC command by using the second method to determine the transmission power. Then, when the URLLC terminal 200-1 transmits URLLC data in the cell A (Step S407), the eMBB terminal 200-2 in the cell B transmits eMBB data with the transmission power determined by using the second method (Step S408). Here, the single term in the equation for determining the transmission power for the eMBB data is calculated based on the absolute value designated by the TPC command; therefore, the transmission power that is gradually increased during the time period in which for example the first method using the relative value is selected may be rapidly decreased. Thus, as the eMBB terminal 200-2 transmits eMBB data with a small transmission power, the interference caused to the URLLC data in the cell A is relatively small (Step S409).

As described above, according to the present embodiment, it is determined whether the single term included in the equation for determining the transmission power of the terminal device is calculated by using the first method or the second method on the basis of the resource used to transmit data having a high level of priority in an adjacent cell and the position of the terminal device in its own cell. Then, the determined calculation method is notified to the terminal device in its own cell. Thus, the method for calculating the transmission power of the terminal device in its own cell may be switched with regard to the frequency and the time to transmit data having a high level of priority in an adjacent cell. As a result, when data having a high level of priority is transmitted in an adjacent cell, the interference from its own cell may be reduced, and the wireless communication may be conducted efficiently.

Furthermore, although URLLC data is used as an example of the data having a high level of priority in the description according to the above-described third and fourth embodiments, the data having a high level of priority does not always need to be URLLC data. That is, the transmission power of the other data is promptly changed by using the second method using the absolute value with regard to the resource for transmitting the data that needs the low delay and the high reliability as compared with the other data, whereby the interference from the other data may be reduced.

Figure 12:
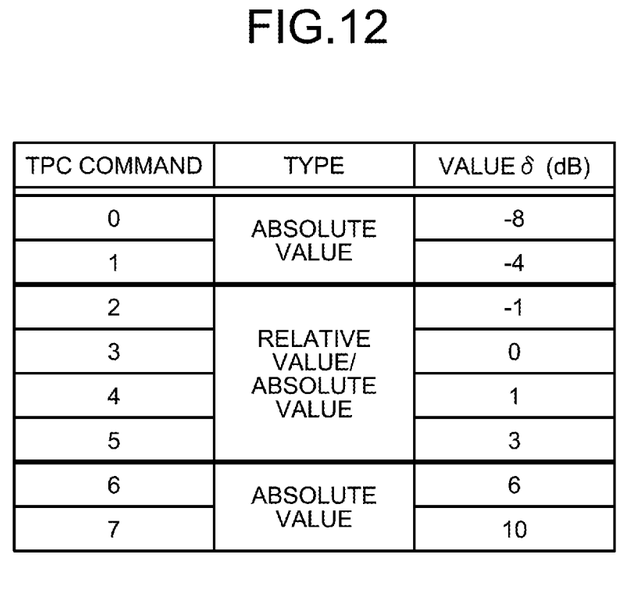
FIG. 12 is a diagram that illustrates specific examples of a value designated by a TPC command.

Furthermore, according to each of the above-described embodiments, the relative value and the absolute value designated by the TPC command may be an identical value. Specifically, as illustrated in for example FIG. 12, each TPC command is related to a single value, and the value designated by the TPC command is used as a relative value when the first method is selected as the method for calculating the single term in the equation for determining the transmission power. Furthermore, the value designated by the TPC command is used as an absolute value when the second method is selected as the method for calculating the single term in the equation for determining the transmission power.

In this case, the value having a large absolute value may be prevented from being used as a relative value. Specifically, as illustrated in for example FIG. 12, the values "−8 dB", "−4 dB", "6 dB", and "10 dB" corresponding to the TPC commands "0", "1", "6", and "7" are not used as a relative value. Therefore, when the first method is selected as the method for calculating the single term in the equation for determining the transmission power, the TPC commands "0", "1", "6", and "7" are not generated. As the values used as a relative value are limited in the above manner, a change in the transmission power when the first method is selected may be small.

The above-described embodiments may be implemented in combination as appropriate. For example, the first embodiment to the third embodiment may be combined so that the method for calculating the single term in the equation for determining the transmission power is switched in a case where the communication environment changes and in a case where data having a high level of priority is transmitted. Furthermore, the first embodiment to the fourth embodiment may be combined so that the method for calculating the single term in the equation for determining the transmission power is switched in a case where data having a high level of priority is transmitted in an adjacent cell.

According to an aspect of the base station device, the terminal device, the wireless communication system, and the communication method disclosed in the subject application, there is an advantage such that the wireless communication is conducted efficiently.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device that communicates with a first terminal device that transmits first data, the base station device comprising:
   a controller configured to determine whether a calculation method for a single term among a plurality of terms included in an equation for determining a transmission power of the first terminal device is either a first method or a second method, the first method using a relative value based on a previous value of the single term, the second method using an absolute value that is irrelevant to the previous value of the single term; and
   a transmitter configured to transmit, to the first terminal device, notification information for notifying the calculation method determined by the controller, wherein
   the controller selects the first method or the second method as the calculation method to determine the transmission power of the first terminal device in accordance with a type of data transmitted by the first terminal device, and wherein
   the controller is further configured to select, based on the type of data transmitted by the first terminal device being a first type, the first method as the calculation method to determine the transmission power of the first terminal device, and the controller is further configured to select, based on the type of data transmitted by the first terminal device being a second type, the second method as the calculation method to determine the transmission power of the first terminal device.

2. The base station device according to claim 1, wherein the transmitter transmits a transmission power control command designating a value corresponding to the relative value or the absolute value.

3. The base station device according to claim 1, wherein the controller
- determines whether a communication environment between the base station device and a terminal device has changed, and
- selects the second method when it is determined that the communication environment has changed.

4. The base station device according to claim 1, wherein
- the controller selects the second method as a method for calculating a transmission power for a resource used by a first terminal device to transmit second data, and
- the transmitter transmits the notification information indicating that the second method is selected to a second terminal device.

5. The base station device according to claim 1, wherein the controller
- identifies a resource used by a first terminal device to transmit data, the first terminal device communicating with another base station device different from the base station device, and
- selects the second method as a method for calculating a transmission power for the resource identified, and
- the transmitter transmits the notification information indicating that the second method is selected to a second terminal device communicating with the base station device.

6. The base station device according to claim 5, wherein
- the controller determines a position of the second terminal device, and
- the transmitter transmits the notification information indicating that the second method is selected to the second terminal device in a case where it is determined that a distance from the base station device to the second terminal device is more than a predetermined distance.

7. A terminal device comprising:
- a receiver configured to receive notification information indicating whether a method for calculating a single term among a plurality of terms included in an equation for determining a transmission power is either a first method or a second method, the first method using a relative value based on a previous value of the single term, the second method using an absolute value that is irrelevant to the previous value of the single term;
- a controller configured to calculate a transmission power by using the first method or the second method in accordance with the notification information received by the receiver; and
- a transmitter configured to transmit a signal with the transmission power calculated by the controller, wherein the notification information includes information indicating selection of the first method or the second method as the calculation method to determine the transmission power of an own terminal device in accordance with a type of data transmitted by the terminal device, wherein
the first method is selected as the calculation method to determine the transmission power of the terminal device based on the type of data transmitted by the terminal device being a first type, and
the second method is selected as the calculation method to determine the transmission power of the terminal device based on the type of data transmitted by the terminal device being a second type.

8. A wireless communication system comprising:
a base station device; and
a first terminal device,
the base station device including:
- a first controller configured to determine whether a calculation method for a single term among a plurality of terms included in an equation for determining a transmission power of the first terminal device is either a first method or a second method, the first method using a relative value based on a previous value of the single term, the second method using an absolute value that is irrelevant to the previous value of the single term; and
- a transmitter configured to transmit notification information for notifying the calculation method determined by the first controller, wherein the first controller selects the first method or the second method as the calculation method to determine the transmission power of the first terminal device in accordance with a type of data transmitted by the first terminal device, and
- the transmitter transmits the notification information to the first terminal device, wherein the first controller is further configured to select, based on the type of data transmitted by the first terminal device being a first type, the first method as the calculation method to determine the transmission power of the first terminal device, and
the first controller is further configured to select, based on the type of data transmitted by the first terminal device being a second type, the second method as the calculation method to determine the transmission power of the first terminal device, and
the first terminal device including:
- a receiver configured to receive the notification information transmitted from the base station device;
- a second controller configured to calculate a transmission power by using the first method or the second method in accordance with the notification information received by the receiver; and
- a transmitter configured to transmit a signal with the transmission power calculated by the second controller.

* * * * *